US012067785B2

(12) United States Patent
Ambrus et al.

(10) Patent No.: US 12,067,785 B2
(45) Date of Patent: Aug. 20, 2024

(54) EVALUATION PROCESS FOR A MULTI-TASK NETWORK

(71) Applicant: Toyota Research Institute, Inc., Los Altos, CA (US)

(72) Inventors: Rares A. Ambrus, San Francisco, CA (US); Dennis Park, Fremont, CA (US); Vitor Guizilini, Santa Clara, CA (US); Jie Li, Los Altos, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 451 days.

(21) Appl. No.: 17/358,497

(22) Filed: Jun. 25, 2021

(65) Prior Publication Data
US 2022/0300768 A1 Sep. 22, 2022

Related U.S. Application Data

(60) Provisional application No. 63/161,735, filed on Mar. 16, 2021.

(51) Int. Cl.
*G06K 9/62* (2022.01)
*G01S 17/42* (2006.01)
(Continued)

(52) U.S. Cl.
CPC .............. *G06V 20/58* (2022.01); *G01S 17/42* (2013.01); *G01S 17/89* (2013.01); *G01S 17/931* (2020.01);
(Continued)

(58) Field of Classification Search
CPC ..... G06T 7/10; G06T 7/50; G06T 7/11; G06T 2207/10024; G06T 2207/10028;
(Continued)

(56) References Cited

U.S. PATENT DOCUMENTS 10,937,178 B1 * 3/2021 Srinivasan .............. G06T 7/521
2009/0316957 A1 12/2009 Chen et al.
(Continued)

OTHER PUBLICATIONS

Mauri A, Khemmar R, Boutteau R, Decoux B, Ertaud JY, Haddad M. A new evaluation approach for deep learning-based monocular depth estimation methods. In2020 IEEE 23rd International Conference on Intelligent Transportation Systems (ITSC) Sep. 20, 2020 (pp. 1-6). IEEE. (Year: 2020).*
(Continued)

*Primary Examiner* — Edward F Urban
*Assistant Examiner* — Duy Tran
(74) *Attorney, Agent, or Firm* — Christopher G. Darrow; Darrow Mustafa PC

(57) ABSTRACT

Systems, methods, and other embodiments described herein relate to evaluating a perception network in relation to the accuracy of depth estimates and object detections. In one embodiment, a method includes segmenting range data associated with an image according to bounding boxes of objects identified in the image to produce masked data. The method includes comparing the masked data with corresponding depth estimates in the depth map according to an evaluation mask that correlates the depth estimates with the depth map. The method includes providing a metric that quantifies the comparing to assess a network that generated the depth map and the bounding boxes.

17 Claims, 8 Drawing Sheets

(51) Int. Cl.

| | | |
|---|---|---|
| G01S 17/89 | (2020.01) | |
| G01S 17/931 | (2020.01) | |
| G06F 18/21 | (2023.01) | |
| G06F 18/2113 | (2023.01) | |
| G06F 18/214 | (2023.01) | |
| G06F 18/25 | (2023.01) | |
| G06K 9/00 | (2022.01) | |
| G06K 9/46 | (2006.01) | |
| G06N 3/04 | (2023.01) | |
| G06N 3/08 | (2023.01) | |
| G06N 20/00 | (2019.01) | |
| G06T 7/10 | (2017.01) | |
| G06T 7/11 | (2017.01) | |
| G06T 7/50 | (2017.01) | |
| G06V 10/46 | (2022.01) | |
| G06V 10/75 | (2022.01) | |
| G06V 20/56 | (2022.01) | |
| G06V 20/58 | (2022.01) | |

(52) U.S. Cl.
CPC ...... *G06F 18/2113* (2023.01); *G06F 18/2155* (2023.01); *G06F 18/217* (2023.01); *G06F 18/251* (2023.01); *G06N 3/04* (2013.01); *G06N 3/08* (2013.01); *G06N 20/00* (2019.01); *G06T 7/10* (2017.01); *G06T 7/11* (2017.01); *G06T 7/50* (2017.01); *G06V 10/462* (2022.01); *G06V 10/757* (2022.01); *G06V 20/56* (2022.01); *G06T 2207/10024* (2013.01); *G06T 2207/10028* (2013.01); *G06T 2207/20016* (2013.01); *G06T 2207/20081* (2013.01); *G06T 2207/20084* (2013.01); *G06T 2207/30248* (2013.01)

(58) Field of Classification Search
CPC . G06T 2207/20016; G06T 2207/20081; G06T 2207/20084; G06T 2207/30248; G06V 20/58; G06V 10/462; G06V 10/22; G06V 10/757; G06V 10/759; G06V 20/56; G06V 20/64; G01S 17/931; G01S 17/42; G01S 17/89; G06N 3/04; G06N 3/08; G06F 18/217; G06F 18/2113; G06F 18/2155; G06F 18/251

See application file for complete search history.

(56) References Cited

U.S. PATENT DOCUMENTS

| | | | |
|---|---|---|---|
| 2018/0121762 A1 | 5/2018 | Han et al. | |
| 2018/0348374 A1* | 12/2018 | Laddha | G01S 17/931 |
| 2019/0147245 A1* | 5/2019 | Qi | G06V 10/82 382/103 |
| 2020/0082180 A1* | 3/2020 | Wang | G06V 20/56 |
| 2021/0026355 A1* | 1/2021 | Chen | G06F 18/22 |
| 2021/0073597 A1 | 3/2021 | Han et al. | |

OTHER PUBLICATIONS

Simonelli et al. "Demystifying Pseudo-LiDAR for Monocular 3d Object Detection", Dec. 10, 202, pp. 1-17, arXiv:2012.05796v1 [cs.CV] Dec. 10, 2020.
Weng et al. "Monocular 3D Object Detection with Pseudo-LiDAR Point Cloud" In Proceedings of the IEEE/CVF International Conference on Computer VisionWorkshops, 2019, pp. 1-30.
You et al. "Pseudo-LiDAR++: Accurate Depth for 3D Object Detection in Autonomous Driving", Feb. 15, 2020, pp. 1-22, published as a conference paper at ICLR 2020.
Ma et al. "Rethinking Pseudo-LiDAR Representation" In European Conference on Computer Vision, pp. 1-21 arXiv:2008.04582v1 [cs.CV] Aug. 11, 2020.
Zhou et al. "Objects as points" Apr. 25, 2019, pp. 1-12, arXiv:1904.07850v2 [cs.CV] Apr. 25, 2019.
Tian et al. "FCOS: Fully Convolutional One-Stage Object Detection" In Proceedings of the IEEE/CVF International Conference on Computer Vision, 2019, pp. 9627-9636.
Simonelli et al. "Disentangling Monocular 3D Object Detection" In Proceedings of the IEEE/CVF International Conference on Computer Vision, pp. 1991-1999. 2019.
Geng et al., "Deep Dual-Modal Traffic Objects Instance Segmentation Method Using Camera and LIDAR Data for Autonomous Driving," Remote Sens. vol. 20, 2020, found at: https://www.mdpi.com/2072-4292/12/20/3274.
Eppel et al., "Generator evaluator-selector net for panoptic image segmentation and splitting unfamiliar objects into parts," found at: arXiv: 1908.09108, 2019.
Cheng et al., "Boundary IoU: Improving Object-Centric Image Segmentation Evaluation," Computer Vision and Pattern Recognition, Mar. 30, 2021, found at: arXiv:2103.16562v1 [cs.CV] Mar. 30, 2021.
Ammirato et al., "A Mask-RCNN Baseline for Probabilistic Object Detection," found at: arXiv:1908.03621v2 [cs.CV] Oct. 14, 2019.
Cho et al., "A Large RGB-D Dataset for Semi-supervised Monocular Depth Estimation," IEEE Transactions on Image Processing, Apr. 23, 2019, pp. 1-13, arXiv:1904.10230v1 [cs.CV] Apr. 23, 2019.
Lin et al., "Feature Pyramid Networks for Object Detection", In CVPR, 2017. 3.
Godard et al., "Digging into self-supervised monocular depth estimation" in arXiv preprint arXiv:1806.01260v3, 2018.
Zhou et al., "Stereo Magnification: Learning View Synthesis Using Multiplane Images" arXiv:1805.09817v1 [cs.CV] May 24, 2018.
Xu et al. "Multi-level Fusion Based 3D Object Detection from Monocular Images" In Proceedings of the IEEE conference on computer vision and pattern recognition, pp. 2345-2353, 2018.
Wang et al. "Train in Germany, Test in the USA: Making 3D Object Detectors Generalize" In Proceedings of the IEEE/CVF Conference on Computer Vision and Pattern Recognition, pp. 11713-11723, 2020.
Vijayanarasimhan et al. "SfM-Net: Learning of Structure and Motion from Video." arXiv:1704.07804v1 [cs.CV] Apr. 25, 2017.
Vianney et al. "RefinedMPL: Refined Monocular PseudoLiDAR for 3d Object Detection in Autonomous Driving" arXiv preprint pp. 1-10 arXiv:1911.09712v1 [cs.CV] Nov. 21, 2019.
Ummenhofer et al. "DeMoN: Depth and Motion Network for Learning Monocular Stereo" In IEEE Conference on computer vision and pattern recognition (CVPR), vol. 5, p. 6, 2017.
Laina et al. "Deeper Depth Prediction With Fully Convolutional Residual Networks" In International Conference on 3D Vision (3DV), pp. 239-248, arXiv:1606.00373v2 [cs.CV] Sep. 19, 2016.
Qin et al. "MonoGRNet: A Geometric Reasoning Network for Monocular 3d Object Localization" In Proceedings of the AAAI Conference on Artificial Intelligence, vol. 33, pp. 8851-8858, 2019.
Qian et al. "End-to-End Pseudo-LiDAR for Image-Based 3d Object Detection" In Proceedings of the IEEE/CVF Conference on Computer Vision and Pattern Recognition, pp. 5881-5890, 2020.
Qi et al. "Geonet: Geometric Neural Network for Joint Depth and Surface Normal Estimation" In International Conference on Computer Vision and Pattern Recognition (CVPR), pp. 283-291, 2018.
Klingner et al. "Self-Supervised Monocular Depth Estimation: Solving the Dynamic Object Problem by Semantic Guidance" arXiv preprint arXiv:2007.06936v2 [cs.CV] Jul. 21, 2020.
Barabanau et al. "Monocular 3d Object Detection Via Geometric Reasoning on Keypoints" arXiv:1905.05618v1 [cs.CV] May 14, 2019.
Beker al. Monocular Differentiable Rendering for Self-Supervised 3d Object Detection, arXiv:2009.14524v1 [cs.CV] Sep. 30, 2020.
Kehl ett al. "SSD-6d: Making RGB-Based 3D Detection and 6D Pose Estimation Great Again" in Proceedings of the IEEE international conference on computer vision, pp. 1521-1529, 2017.

(56) References Cited

OTHER PUBLICATIONS

Brazil et al. "Kinematic 3d object detection in monocular video" In European Conference on Computer Vision, pp. 135-152. Springer, arXiv:2007.09548v1 [cs.CV] Jul. 19, 2020.

Jorgensen et al. "Monocular 3d Object Detection and Box Fitting Trained End-to-End Using Intersection-Over-Union Loss" arXiv preprint arXiv:1906.08070v2 [cs.CV] Jun. 20, 2019.

Hu et al. "Squeeze-and-Excitation Networks" In Proceedings of the IEEE conference on computer vision and pattern recognition, pp. 7132-7141, 2018.

Chen et al. "Monocular 3d Object Detection Using Pairwise Spatial Relationships" In Proceedings of the IEEE/CVF Conference on Computer Vision and Pattern Recognition, pp. 12093-12102, 2020.

Deng et al. "Imagenet: A Large-Scale Hierarchical Imagedatabase" In 2009 IEEE conference on computer vision and pattern recognition, pp. 248-255. IEEE, 2009.

He et al. "Deep Residual Learning for Image Recognition" In Proceedings of the IEEE conference on computer vision and pattern recognition, pp. 770-778, 2016.

Eigen et al. "Depth Map Prediction from a Single Image Using a Multi-Scale Deep Network" In Advances in neural information processing systems, pp. 2366-2374, arXiv:1406.2283v1 [cs.CV] Jun. 9, 2014.

Fu et al. "Deep Ordinal Regression Network for Monocular Depth Estimation" In International Conference on Computer Vision and Pattern Recognition (CVPR), pp. 2002-2011, 2018.

Gahlertet al. "Cityscapes 3D: Dataset and Benchmark for 9 DoF Vehicle Detection" arXiv:2006.07864v1 [cs.CV] Jun. 14, 2020.

Geiger et al. "Vision Meets Robotics: The Kitti Dataset" The International Journal of Robotics Research, 32(11) pp. 1231-1237, 2013.

Guizilini et al. "Semantically-Guided Representation Learning for Self-Supervised Monocular Depth" In International Conference on Learning Representations (ICLR), arXiv:2002.12319v1 [cs.CV] Feb. 27, 2020.

Guizilini et al. "3D Packing for Self-Supervised Monocular Depth Estimation" In IEEE Conference on Computer Vision and Pattern Recognition (CVPR), pp. 2485-2494 2020.

Lee et al. "From Big to Small: Multi-Scale Local Planar Guidance for Monocular Depth Estimation" arXiv preprint arXiv:1907.10326, 2019.

Lee et al. "Centermask: Real-time Anchor-Free Instance Segmentation" arXiv:1911.06667v6 [cs.CV] Apr. 2, 2020.

Lin et al. "Microsoft COCO: Common Objects in Context" In European conference on computer vision, pp. 740-755. Springer, 2014.

Ma et al. "Accurate Monocular 3D Object Detection Via Color-Embedded 3D Reconstruction for Autonomous Driving" In Proceedings of the IEEE/CVF International Conference on Computer Vision, pp. 6851-6860, 2019.

Manhardt et al. "ROI-10D: Monocular Lifting of 2D Detection to 6D Pose and Metric Shape" In Proceedings of the IEEE/CVF Conference on Computer Vision and Pattern Recognition, pp. 2069-2078, 2019.

Mousavian et al. "3D Bounding Box Estimation Using Deep Learning and Geometry" In Proceedings of the IEEE Conference on Computer Vision and Pattern Recognition, pp. 7074-7082, 2017.

Pillai et al. "Superdepth: Self-Supervised, Super-Resolved Monocular Depth Estimation" in arXiv:1810.01849v1 [cs.CV] Oct. 3, 2018.

\* cited by examiner

EVALUATION PROCESS FOR A MULTI-TASK NETWORK

CROSS-REFERENCE TO RELATED APPLICATIONS

This application claims benefit of U.S. Provisional Application No. 63/161,735, filed on, Mar. 16, 2021, which is herein incorporated by reference in its entirety.

TECHNICAL FIELD

The subject matter described herein relates, in general, to systems and methods for evaluating a network, and, more particularly, to using an evaluation mask associated with bounding boxes of identified objects to focus evaluation on salient aspects.

BACKGROUND

Various devices that operate autonomously or that otherwise function to perceive aspects about a surrounding environment often use sensors that facilitate perceiving obstacles and additional aspects of the surrounding environment. The ability to reconstruct the structure of a scene with high accuracy is important for awareness and navigation of the scene. As one example, a robotic device uses information from the sensors to develop awareness of the surrounding environment in order to avoid hazards when navigating. In particular, the robotic device uses the perceived information to determine a 3-D structure of the environment so that the device may distinguish between navigable regions and the potential hazards. In various aspects, this can include perceiving distances and detecting discrete objects, which generally relies on accurately processing available sensor data into discrete observations.

In one approach, the robotic device may employ monocular cameras to capture images of the surrounding environment from which distances and other aspects can be estimated, such as identifying discrete objects. This approach may use a single combined machine learning model to provide multiple observations (e.g., distance and object detection). However, accurately evaluating such a model can represent a significant difficulty. That is, standard metrics for assessing single-task models may not accurately identify improvements in a multi-task network since such metrics generally focus on the individual tasks instead of combined aspects (e.g., depth estimates of identified objects). Accordingly, existing approaches may not accurately identify which multi-task model is best suited for implementation.

SUMMARY

Example systems and methods relate to an improved approach to evaluating a combined network that uses an evaluation mask to focus analysis on salient features. As previously noted, implementing multiple separate networks to perform depth estimation and object detection can be resource-intensive. Further, in the instance of a multi-task network, accurately evaluating such a network can represent an additional difficulty due to standard approaches not fitting well with the complexity of the multi-task network.

Therefore, in one arrangement, an evaluation system functions to generate an improved metric that better accounts for the form of the combined network to identify improvements associated with network structure and different training approaches in order to better distinguish between networks. Thus, in one arrangement, the evaluation system initially acquires an image that is, for example, a monocular RGB image. Additionally, the evaluation system acquires ground-truth data associated with the image, such as range data in the form of LiDAR returns. The evaluation system can then generate outputs from the network under evaluation or use existing outputs from the network associated with the image. In either case, the evaluation system uses the range data to generate an evaluation mask that facilitates generating the improved metric.

For example, the evaluation system segments the range data according to bounding boxes that identify objects in the image, which may also be provided as part of the ground-truth data. The result is an evaluation mask, which the evaluation system can then project into the image with the depth data from the network. Thus, the resulting evaluation mask includes ground-truth range data that correlates with the objects in the image, instead of an entirety of the image. Similarly, the evaluation system can mask the depth map using the bounding boxes or use the evaluation mask directly to determine points in the depth map having corresponding points for comparison. In any case, the evaluation system compares the evaluation mask with associated portions of the depth data to derive a metric. The metric characterizes the accuracy of the network in relation to both depth estimation and object detection in a single value. The comparison itself generally involves comparing the evaluation mask against the depth across all points in the evaluation mask or on a per-object basis, which is averaged. This can further be done across a plurality of outputs in a dataset to provide better results. In this way, the derived metric provides for evaluating an output of the network on key areas that better correlates depth estimation and 3D detection performance instead of evaluating across all areas of the outputs that include less salient regions.

In one embodiment, an evaluation system is disclosed. The evaluation system includes one or more processors and a memory communicably coupled to the one or more processors. The memory stores a network module including instructions that, when executed by the one or more processors, cause the one or more processors to segment range data associated with an image according to bounding boxes of objects identified in the image to produce masked data. The network module includes instructions to compare the masked data with corresponding depth estimates in the depth map according to an evaluation mask that correlates the depth estimates with the depth map. The network module includes instructions to provide a metric that quantifies the comparing to assess a network that generated the depth map and the bounding boxes.

In one embodiment, a non-transitory computer-readable medium including instructions that, when executed by one or more processors, cause the one or more processors to perform various functions is disclosed. The instructions include instructions to segment range data associated with an image according to bounding boxes of objects identified in the image to produce masked data. The instructions include instructions to compare the masked data with corresponding depth estimates in the depth map according to an evaluation mask that correlates the depth estimates with the depth map. The instructions include instructions to provide a metric that quantifies the comparing to assess a network that generated the depth map and the bounding boxes.

In one embodiment, a method is disclosed. The method includes segmenting range data associated with an image according to bounding boxes of objects identified in the image to produce masked data. The method includes comparing the masked data with corresponding depth estimates in the depth map according to an evaluation mask that correlates the depth estimates with the depth map. The method includes providing a metric that quantifies the comparing to assess a network that generated the depth map and the bounding boxes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with an improved approach to evaluating a combined network that uses an evaluation mask to focus analysis on salient features are disclosed. As previously noted, implementing multiple separate networks to perform depth estimation and object detection can be resource-intensive. Further, in the instance of a multi-task network, accurately evaluating such a network can represent an additional difficulty due to standard approaches not fitting well with the complexity of the multi-task network.

Therefore, in one arrangement, an evaluation system functions to generate an improved metric that better accounts for the form of the combined network to identify improvements associated with a network structure and different training regimens in order to better distinguish between networks. Thus, in one arrangement, the evaluation system initially acquires an image that is, for example, a monocular RGB image. Additionally, the evaluation system acquires ground-truth data associated with the image, such as range data in the form of LiDAR returns. The evaluation system can then generate outputs from the network under evaluation or use existing outputs associated with the image.

In either case, the evaluation system uses the range data to generate an evaluation mask that facilitates generating the improved metric.

For example, the evaluation system segments the range data according to bounding boxes that identify objects in the image. The result is the evaluation mask, which the evaluation system forms by projecting the segmented data into the image with the depth data from the network. Thus, the resulting evaluation mask includes ground-truth range data that correlates with the objects in the image, instead of an entirety of the image. Similarly, the evaluation system can mask the depth map using the bounding boxes or using the evaluation mask directly to determine points in the depth map having corresponding points for comparison. In any case, the evaluation system compares the evaluation mask with associated portions of the depth data to derive a metric. The metric characterizes the accuracy of the network in relation to both depth estimation and object detection in a single value. The comparison itself generally involves comparing the evaluation mask against the depth across all points in the evaluation mask or on a per-object basis, which is averaged. This can further be done across a plurality of outputs in a dataset to provide better results. In this way, the derived metric provides for evaluating an output of the network on key areas that better correlates depth estimation and 3D detection performance instead of evaluating across all areas of the outputs that include less salient regions (e.g., building and road surfaces).

Figure 1:
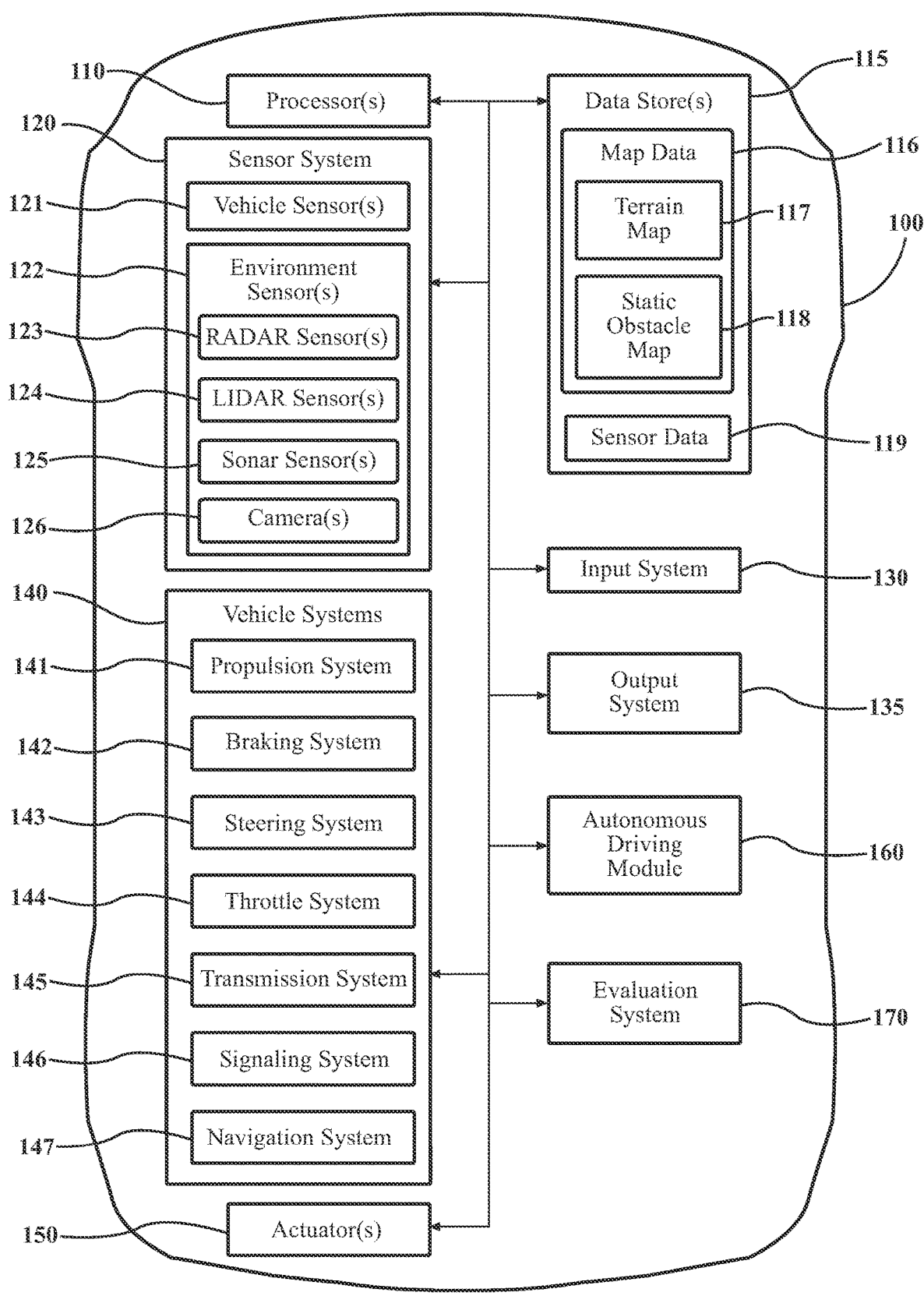
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or another device (e.g., surveillance device) that, for example, observes surroundings to provide determinations therefrom, and thus benefits from the functionality discussed herein. In yet further embodiments, the vehicle 100 may be a statically mounted device, an embedded device, or another device that uses monocular images to derive depth and object information about a scene instead of being a motive device.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-8 for purposes of the brevity of this description. Additionally, it will be appreciated that for simplicity and clarity of illustration, where appropriate, reference numerals have been repeated among the different figures to indicate corresponding or analogous elements. In addition, the discussion out-lines numerous specific details to provide a thorough understanding of the embodiments described herein. Those of skill in the art, however, will understand that the embodiments described herein may be practiced using various combinations of these elements.

In any case, the vehicle 100 includes an evaluation system 170 that functions to evaluate machine learning models. Moreover, while depicted as a standalone component, in one or more embodiments, the evaluation system 170 is integrated with the autonomous driving module 160, the camera 126, or another component of the vehicle 100. Additionally, as noted previously, one or more components of the evaluation system 170 may be cloud-based elements that are remote from the vehicle 100. For example, in at least one arrangement, the evaluation system 170 is separate from the vehicle 100 and provides a selected network to the vehicle 100 upon evaluation. The noted functions and methods will become more apparent with a further discussion of the figures.

Figure 2:
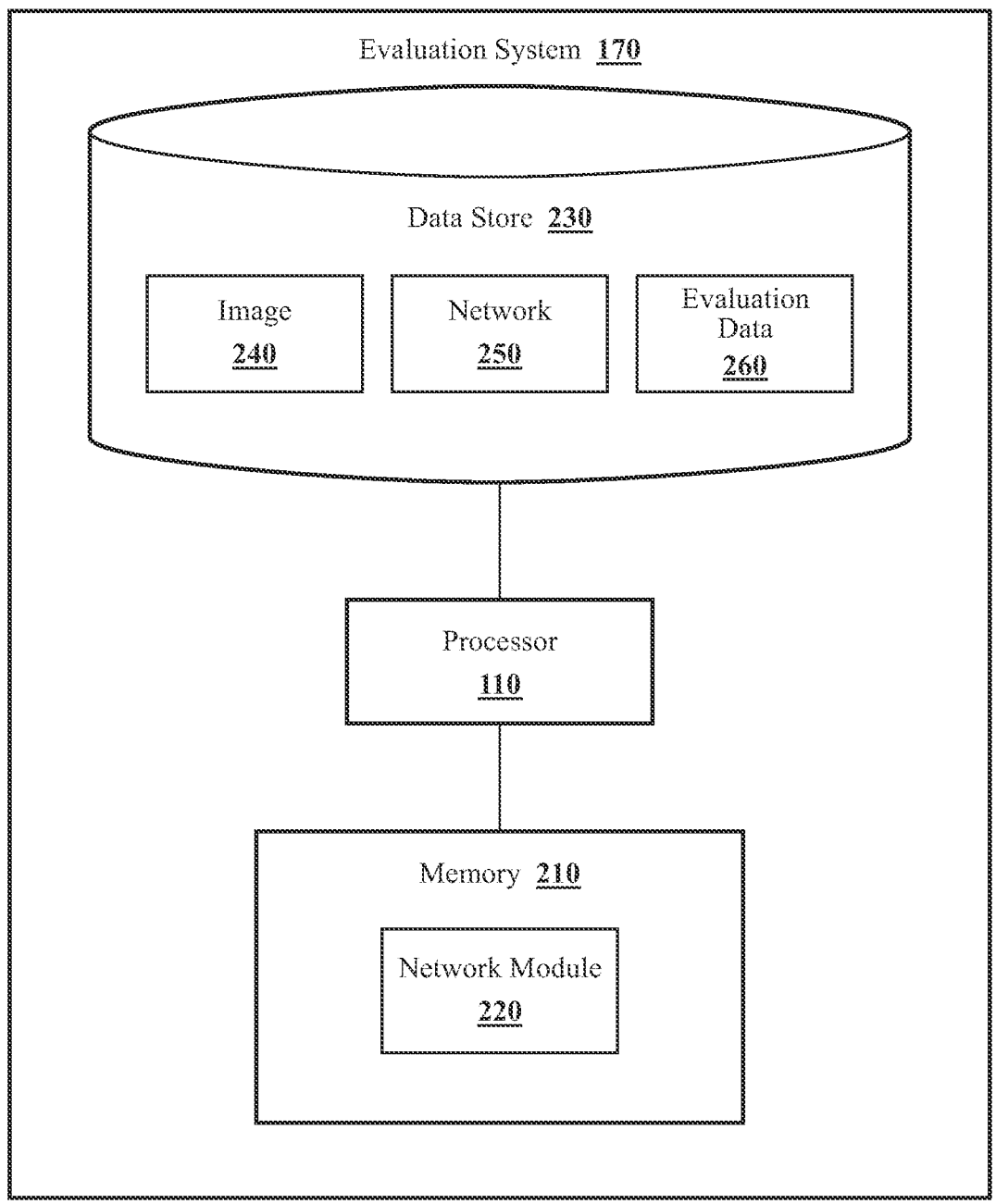
FIG. 2 illustrates one embodiment of an evaluation system that is associated with generating a metric about a combined network.

With reference to FIG. 2, one embodiment of the evaluation system 170 is further illustrated. The evaluation system 170 is shown as including a processor 110. Accordingly, the processor 110 may be a part of the evaluation system 170, or the evaluation system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor, such as a microprocessor that is capable of performing various functions as described herein. In one embodiment, the evaluation system 170 includes a memory 210 that stores the network module 220 and/or other modules that may function in support of generating depth information. The memory 210 is a random-access memory (RAM), read-only memory (ROM), a hard disk drive, a flash memory, or other suitable memory for storing the network module 220. The network module 220 is, for example, computer-readable instructions that, when executed by the processor 110, cause the processor 110 to perform the various functions disclosed herein. In further arrangements, the network module 220 is a logic, integrated circuit, or another device for performing the noted functions that includes the instructions integrated therein.

Furthermore, in one embodiment, the evaluation system 170 includes a data store 230. The data store 230 is, in one arrangement, an electronic data structure stored in the memory 210 or another data store, and that is configured with routines that can be executed by the processor 110 for analyzing stored data, providing stored data, organizing stored data, and so on. Thus, in one embodiment, the data store 230 stores data used by the network module 220 in executing various functions. For example, as depicted in FIG. 2, the data store 230 includes an image 240, a network 250 that is, in at least one approach, a multi-task network that performs at least depth estimation and object detection, and evaluation data 260, along with, for example, other information that is used and/or produced by the network module 220. While the evaluation system 170 is illustrated as including the various elements, it should be appreciated that one or more of the illustrated elements may not be included within the data store 230 in various implementations. For example, the evaluation system 170, in one approach, may not include the network 250 but instead may acquire outputs of the network 250 for evaluation. In any case, the evaluation system 170 stores various data elements in the data store 230 to support functions of the network module 220.

Continuing with the highlighted data elements, the image 240 is, for example, a monocular image from the camera 126 or another imaging device. The monocular image is generally derived from one or more monocular videos that are comprised of a plurality of frames although the image 240 may also be derived from a still image camera. As described herein, monocular images are, for example, images from the camera 126 or another imaging device that are red-green-blue (RGB) images without any further modality, and that encompass a field-of-view (FOV) about the vehicle 100 of at least a portion of the surrounding environment. That is, the monocular image 240 is, in one approach, generally limited to a subregion of the surrounding environment. As such, the image 240 may be a forward-facing direction (i.e., the direction of travel) 60, 90, 120-degree FOV, a rear/side facing FOV, or some other subregion as defined by the imaging characteristics (e.g., lens distortion, FOV, etc.) of the camera 126. In various aspects, the camera 126 is a pinhole camera, a fisheye camera, a catadioptric camera, or another form of camera that acquires images without a specific depth modality.

An individual monocular image itself includes visual data of the FOV that is encoded according to an imaging standard (e.g., codec) associated with the camera 126 or another imaging device that is the source. In general, characteristics of a source camera (e.g., camera 126) and the video standard define a format of the monocular image. Thus, while the particular characteristics can vary according to different implementations, in general, the image has a defined resolution (i.e., height and width in pixels) and format. Thus, for example, the monocular image 240 is an RGB visible light image. In further aspects, the monocular image 240 can be an infrared image associated with a corresponding infrared camera, a black/white image, or another suitable format as may be desired. Whichever format that the evaluation system 170 implements, the image 240 is a monocular image in that there is no explicit additional modality indicating depth nor any explicit corresponding image from another camera from which the depth can be derived (i.e., no stereo camera pair). In contrast to a stereo image that may integrate left and right images from separate cameras mounted side-by-side to provide an additional depth channel, the monocular image 240 does not include explicit depth information, such as disparity maps derived from comparing the stereo images pixel-by-pixel. Instead, the monocular image 240 implicitly provides depth information in the relationships of perspective and size of elements depicted therein from which the network 250 derives the outputs.

Additionally, in one or more arrangements, the data store 230 further includes the evaluation data 260 that corresponds to the image 240. As a general aspect, it should be noted that while the image 240 and the evaluation data 260 are discussed in the singular form, the data store 230, in various arrangements, includes a multiplicity of images and corresponding evaluation data to support evaluating the network 250. The evaluation data 260 associated with the image 240 includes, in one embodiment, ground-truth depth data, ground-truth bounding boxes, and outputs of the network 250, including a depth map and, in at least one arrangement, generated bounding boxes for object detection. Of course, in further implementations, one or more aspects of the evaluation data 260 may be omitted.

As one example of a network that the evaluation system 170 may assess, consider the network 250. The network 250 is, in one arrangement, a multi-task network that supports inferences about depth, object detection, and, in one or more approaches, additional aspects, such as object classification.

In one configuration, the network 250 is a fully convolutional network that is a single stage. Further, the network 250 may be referred to as a feature pyramid network (FPN) that includes a bottom-up backbone for encoding feature maps from the image 240, a top-down pathway that decodes the feature maps, and a shared head. The top-down pathway, which is also referred to as the feature pyramid, in some implementations, includes lateral connections at different scales with the backbone in addition to serial connections between separate layers. Thus, the top-down pathway outputs results at different scales (e.g., bounding boxes) except for the depth map, which is output at the highest resolution. The head can be shared among the separate output scales of the top-down pathway. In one arrangement, the head includes multiple different structures, such as a class component, a two-dimensional component, and a three-dimensional component.

The class component generates a vector of C dimensions corresponding to a number of classes on which the network 250 is trained. The class component may include a multi-class classifier or a plurality of binary classifiers to generate class determinations for objects. The 2D component functions to identify objects in 2D space of the frame of the image 240. In one approach, the 2D component is a convolutional network that generates 2D bounding boxes as identifications from the frame of the image 240. The 2D component can function to provide consistency between 2D and 3D object detections. The head can further include a depth component that acts as a pseudo-LiDAR 3D detector for predicting dense per-pixel depth, which is converted to a 3D point cloud using camera intrinsics. The 3D component concatenates the point cloud with the input image 240 to produce a six-dimensional tensor encompassing pixel color values along with 3D coordinates as the depth map. The 3D component further accepts proposal regions from the 2D component and processed by a 3D detection network that generates the bounding boxes for detecting objects. It should be appreciated that the outlined arrangement of the network 250 is simply one implementation of a multi-task network that the evaluation system 170 may assess and is not intended to be an inclusive statement of all networks that the evaluation system 170 can assess. In general, the approach undertaken by the evaluation system 170 can be applied to any machine learning algorithm that produces the outputs on which the evaluation system 170 operates.

Returning to FIG. 2, the network module 220 may implement the network 250. In various aspects, the network module 220 includes instructions to apply the network 250, and the network 250 may be integrated with the network module 220. In general, the network module 220 controls the network 250 to process the image 240, which includes the image 240, and, when training, uses associated training data to generate a training loss to update the network 250.

In any case, the evaluation system 170, in one embodiment, employs the network 250 to produce the depth map, the bounding boxes, and further information (e.g., 2D bounding boxes, classifications, etc.). As discussed herein, the evaluation of the network 250 will focus on the depth map and bounding boxes. In general, the depth map is a pixel-wise prediction of depths for the image 240, which may be referred to as pseudo-LiDAR depth data or dense depth data. That is, the network 250 provides estimates of depths for different aspects depicted in the image 240. Of course, in the present approach of multi-task functionality, the network 250 further integrates information from beyond the depth map to provide object detections in the form of 2D and 3D bounding boxes.

The network module 220 evaluates the network 250 by initially acquiring the information, including the evaluation data 260, and the image 240. In one arrangement, the evaluation data 260 includes a depth map and bounding boxes generated by the network 250. Thus, the network module 220 initially segments the ground-truth range data associated with the image 240 according to, for example, ground-truth bounding boxes to produce masked data. That is, the network module 220 uses the ground-truth bounding boxes as a mask to segment relevant sections from the range data. Accordingly, points of the range data that fall within the bounding boxes are retained as the masked data while other points are discarded. In this way, the network module 220 can focus the assessment on aspects that are relevant to the primary functions of the network 250 while avoiding more generalized points in the data.

Using the masked data, the network module 220 projects the masked data into the image 240 to produce the evaluation mask. It should be appreciated that the bounding boxes of the ground-truth data may be generated by a separate 2D or 3D object detector or, in further approaches, can be manually labeled in order to facilitate the training. Thus, in various implementations, the bounding boxes may be within the image space of the image 240, and, thus, the network module 220 may project the range data into the image 240 to form an RGB-D image prior to segmenting the range data. That is, in an alternative arrangement, to identify the correspondence between the range data and the bounding boxes, the range data may initially be projected into the image 240 and then segmented according to correspondence with the bounding boxes that exist in the image space. Whichever approach is undertaken, the evaluation mask that results from segmenting the range data functions to focus the assessment by the evaluation system 170.

Figure 3:
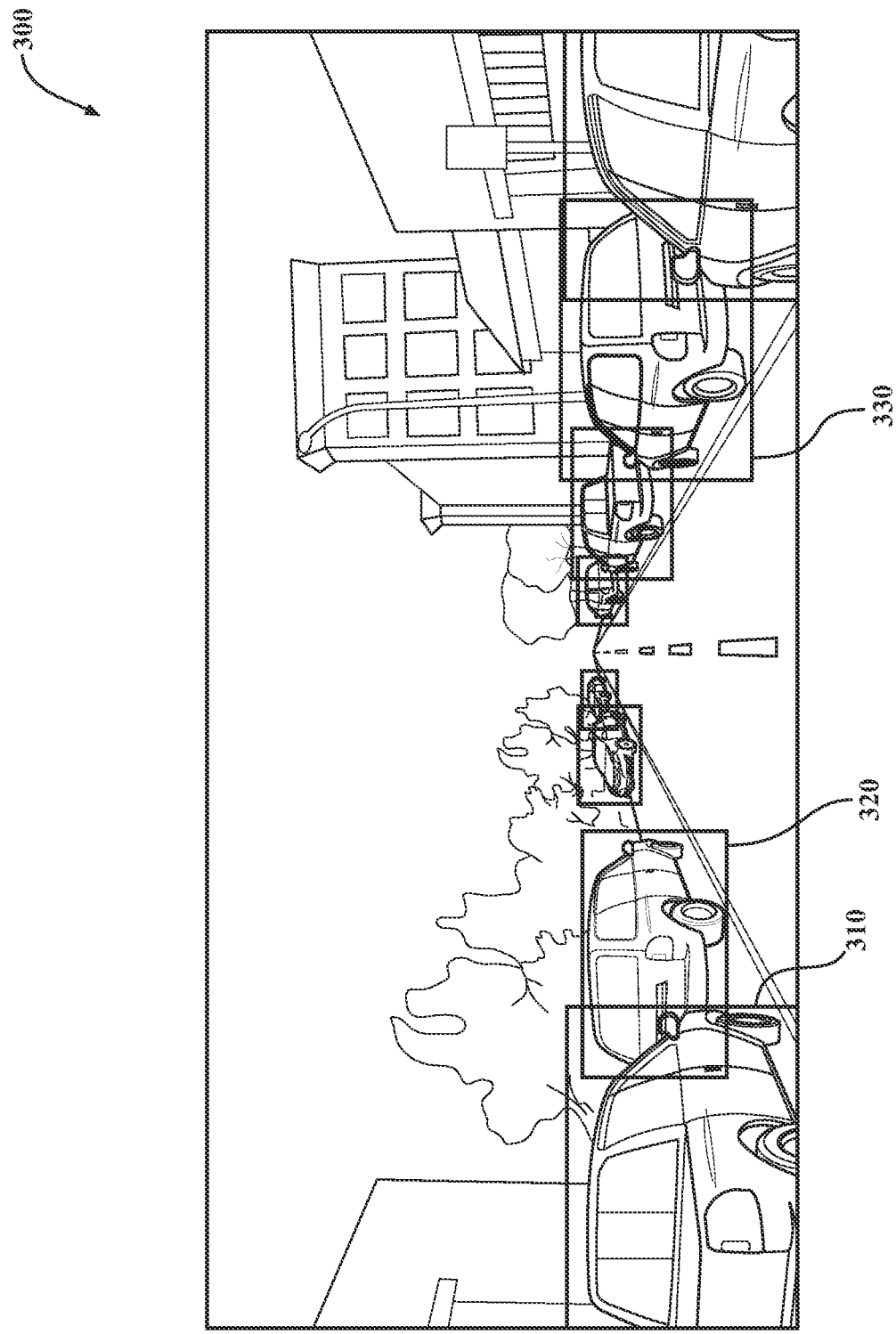
FIG. 3 illustrates one example of an image including bounding boxes for object identification.
Figure 4:
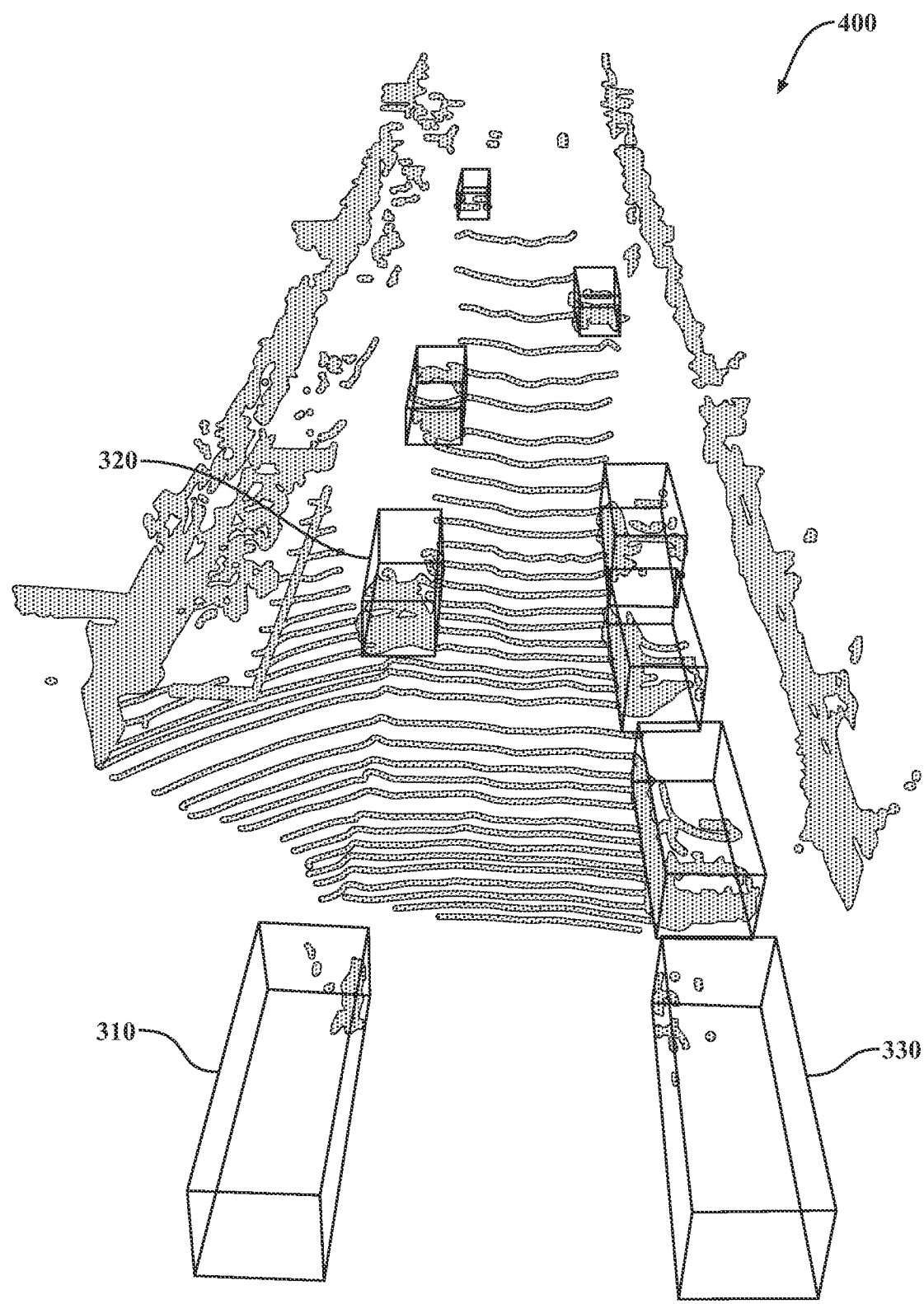
FIG. 4 illustrates an example representation of range data associated with the image of FIG. 3.
Figure 5:
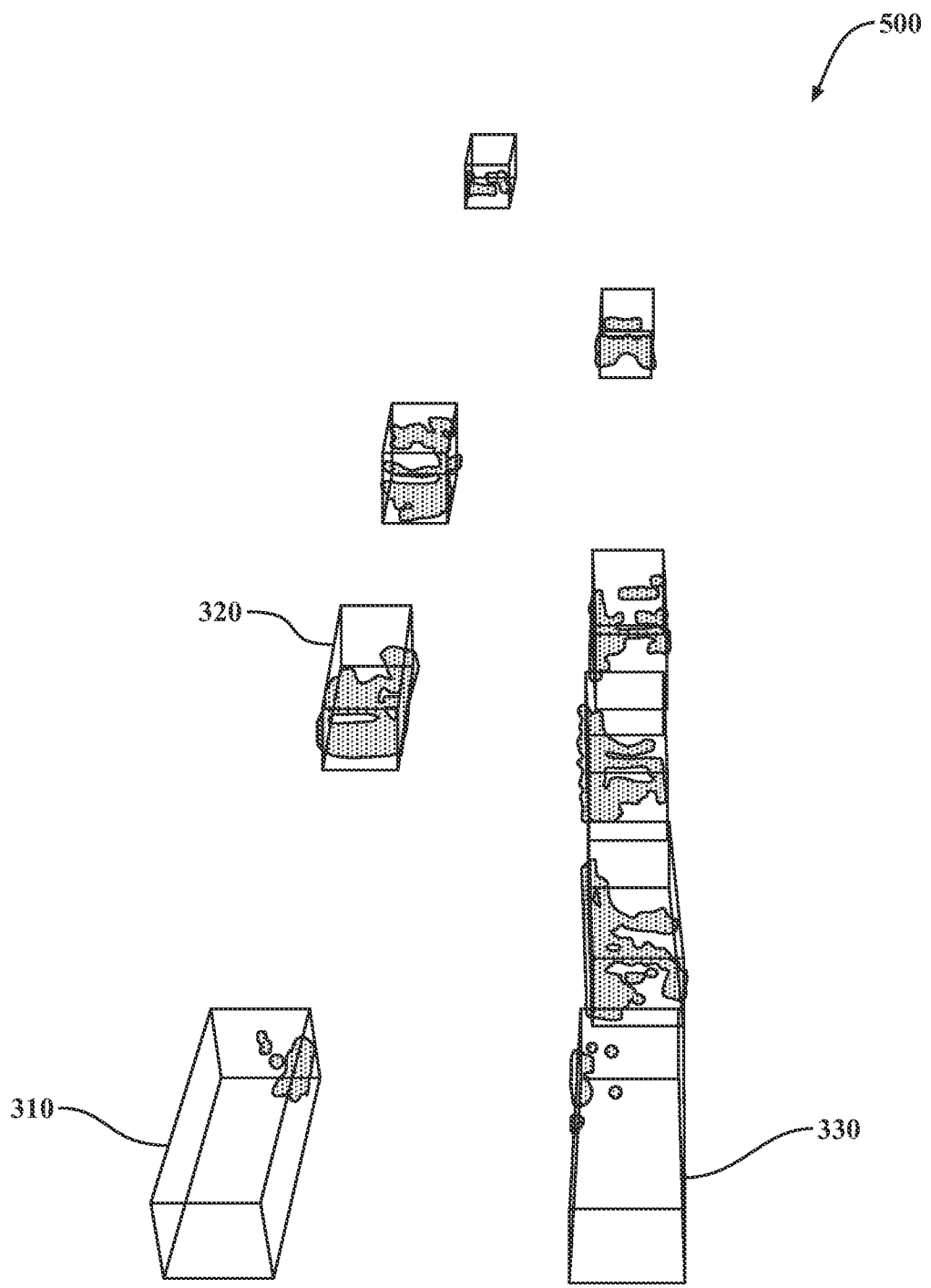
FIG. 5 illustrates one example of an evaluation mask.

By way of example, consider FIGS. 3-5, which illustrate one example of the image 240, corresponding evaluation data, and masked data. FIG. 3 shows an image 300 including bounding boxes 310, 320, and 330 as representative boxes for the image 300. The image 300 is one example of the image 240, while the bounding boxes 310-330 are representative of the evaluation data 260. Further, regarding the bounding boxes 310-330, note that the image 300 includes further bounding boxes that are not numbered, and thus the bounding boxes 310-330 are highlighted for purposes of discussion. Moreover, note that the bounding boxes 310-330 encompass a single class, vehicles, and do not identify further objects, such as trees, buildings, and so on. In general, the bounding boxes correspond with a set of classes on which the network 250 is trained. Accordingly, the identified objects corresponding to the bounding boxes may represent a subset of objects in the image 240 but are generally salient aspects of the image 240 that the network 250 is specifically structured to identify.

Turning to FIG. 4, range data 400 is illustrated that corresponds with the image 300 of FIG. 3. The range data 400 is LiDAR data. As shown, the bounding boxes 310-330 corresponding with the image 300 are represented in FIG. 4, with data points associated with the bounding boxes being further identified. That is, a subset of the range data 400 corresponds with the bounding boxes 310-330 and the further bounding boxes, which, in this case, represents a significantly greater amount of information than what corresponds to the objects. Thus, the evaluation system 170 segments the range data 400 according to the bounding boxes to generate masked data 500 as shown in FIG. 5. Thus, FIG. 5 represents a portion of the range data 400 that corresponds with salient aspects of the image 300.

Figure 6:
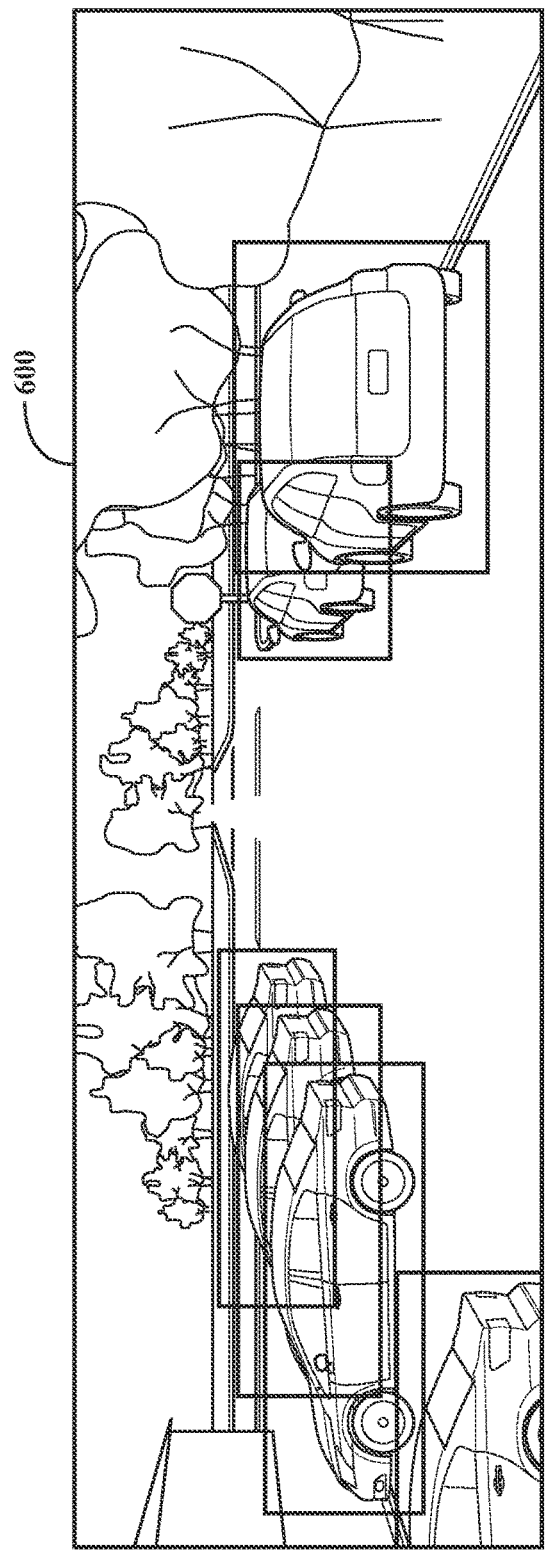
FIG. 6 illustrates one example of an image and a corresponding evaluation mask.
Figure 6:
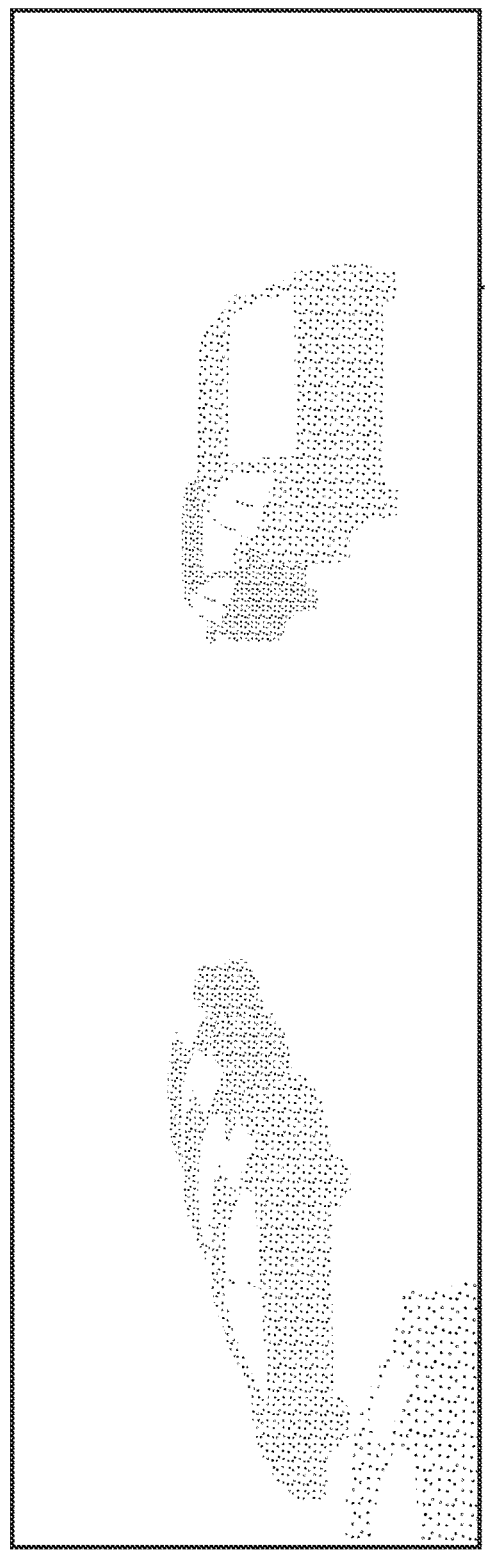
Figure 7:
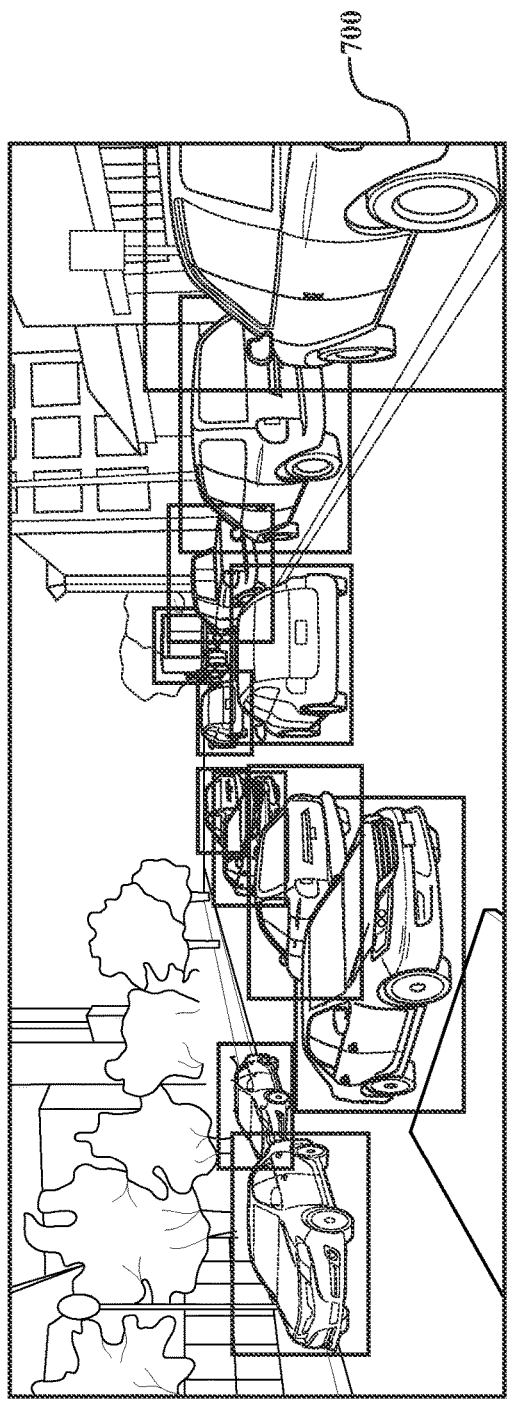
FIG. 7 illustrates another example of an image and a corresponding evaluation mask associated with ground-truth range data.
Figure 7:
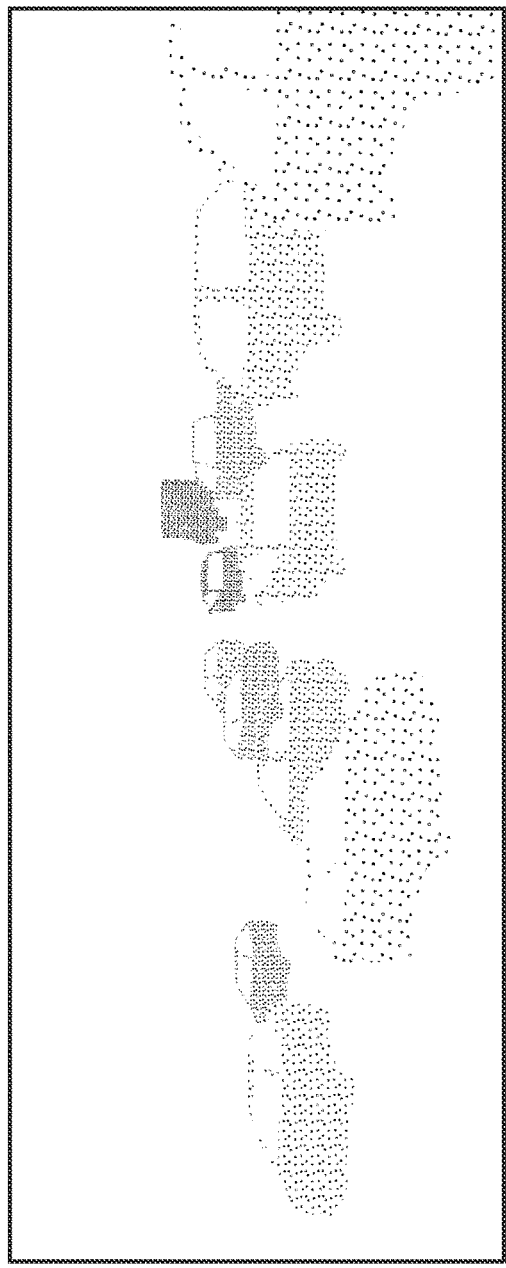

Accordingly, the evaluation system 170, in one arrangement, projects the masked data 500 into the image 300 to produce an evaluation mask. Examples of evaluation masks are further shown in relation to FIGS. 6-7. FIG. 6 illustrates an image 600 and a corresponding evaluation mask 610, while FIG. 7 illustrates an image 700 and a corresponding evaluation mask 710. As seen in the examples, the evaluation masks 610 and 710 include points from the range data associated with the objects identified in the bounding boxes. The evaluation system 170 otherwise discards the remaining points that do not fall within the bounding boxes. In this way, the evaluation system 170 focuses the data that is subsequently used for comparison to relevant objects within the scene.

Returning to FIG. 2, the network module 220 further includes instructions to compare the masked data with corresponding depth estimates in the depth map according to the evaluation mask. Thus, the network module 220 may further project the depth estimates from the network 250 into the image 240 with the evaluation mask or simply compares the evaluation mask against the depth estimate. In general, the process of comparing the evaluation mask with the depth estimates involves averaging values of the comparing, which may occur on a per-object basis or per point across all points of the evaluation mask. For example, the comparing can involve generating a difference between a point from the evaluation mask and a point from the depth estimate. The network module 220 may then average the differences across objects or across the points overall that are being evaluated from the evaluation mask to generate a metric.

The metric characterizes an accuracy of the network 250 at generating the depth map and identifying objects through using the evaluation mask to focus the metric on objects within the scene of the image 240. In this way, the metric identifies improvements in the network 250 comparative to other models. The noted improvements may be based on improvements in training of the network 250 and/or differences in the architecture overall in comparison to other models. In any case, generating the metric in this way provides for an improved assessment of a multi-task model.

Once the network module 220 generates the metric, the network module 220 may provide the metric to quantify the assessment of the network 250. In one arrangement, the network module 220 generates metrics for a plurality of different machine learning models including the network 250. Thus, the network module 220 may score the models according to the metrics and then select one of the models with a desired score. As a result, the selected model can be implemented within the vehicle 100 by, for example, communicating the model to the vehicle 100 and then subsequently using the selected model to perform machine perception tasks, such as the noted depth estimation and object detection. This approach permits the evaluation system 170 to ensure that the models are accurately evaluated in order to facilitate implementing a model that performs best for the noted tasks.

Figure 8:
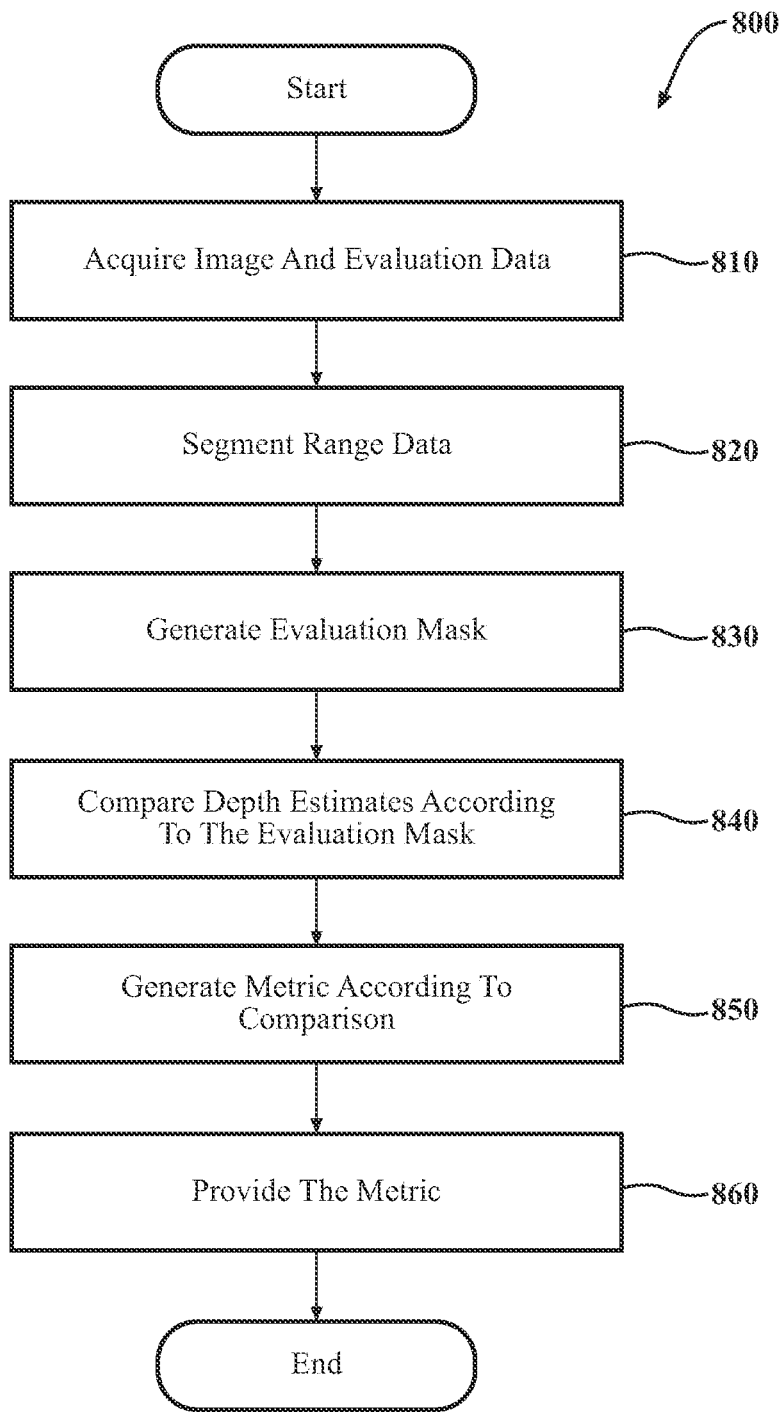
FIG. 8 illustrates a flowchart associated with one embodiment of evaluating a combined network using an evaluation mask.

Additional aspects of evaluating a multi-task network will be discussed in relation to FIG. 8. FIG. 8 illustrates a flowchart of a method 800 that is associated with using an evaluation mask to assess a multi-task network. Method 800 will be discussed from the perspective of the evaluation system 170 of FIGS. 1-2. While method 800 is discussed in combination with the evaluation system 170, it should be appreciated that the method 800 is not limited to being implemented within the evaluation system 170 but is instead one example of a system that may implement the method 800.

At 810, the network module 220 acquires the image 240 and the evaluation data 260. As previously described, the image 240 is comprised of at least a monocular image from a monocular camera or video of a surrounding environment of the vehicle 100 or another device for which the evaluation system 170 is analyzing the information. Accordingly, as noted previously, the evaluation system 170 may be integrated with the vehicle 100 or another device or, alternatively, may receive the image 240 via a communication pathway, such as a wide area network (WAN), and function remotely to analyze the image 240. Moreover, the evaluation data 260 includes at least ground-truth data that coresponds with the image 240, such as range data in the form of LiDAR returns and, in at least one arrangement, 2D or 3D bounding boxes. The 2D bounding boxes may be generated by a separate detection model or may be manually annotated. In any case, the evaluation data 260 includes the ground-truth data and may further include outputs of the network 250 that is being evaluated, such as a depth map that includes corresponding depth estimates for the image 240.

At 820, the network module 220 segments the range data according to bounding boxes of objects identified in the image 240 and/or the range data to produce masked data. It should be appreciated that the system 170 may leverage bounding boxes generated from analyzing the image 240, the range data, and/or from manual annotation. In any case, the bounding boxes, which may be 2D or 3D, correspond with and identify locations of objects in a scene that is associated with both the range data and the image 260. The network module 220, in one approach, segments the range data by selecting points from the range data that fall within the bounding boxes while discarding remaining points in the range data. As a result of the segmenting, the network module 220 focuses the analysis to relevant points in the range data that correspond with objects present in a scene depicted by the image 240.

At 830, the network module 220 generates the evaluation mask using the masked data. That is, in one approach, the network module 220 projects the masked data into the image 240 to form the evaluation mask. The evaluation mask is simply a set of ground-truth depth points from the point cloud of the LiDAR return that corresponds with identified objects in the image 240. The objects may be of a selected class, such as vehicles or other objects that relevant to a particular task (e.g., autonomous driving).

At 840, the network module 220 compares the masked data with corresponding depth estimates in the depth map according to an evaluation mask that correlates the depth estimates with the masked data. In general, network module 220 compares values of the masked data with the depth estimates to generate point-by-point comparisons. The values of the comparisons may be provided as absolute values and can be averaged together to form the metric, as discussed at 850.

At 850, the network module 220 generates the metric according to the comparing. It should be appreciated that the metric characterizes an accuracy of the network 250 at generating the depth map and the bounding boxes. Accordingly, the network module 220 averages the values of the comparison and combines the averages to generate the metric. The network module 220 can generate the averages on a per object basis or across the image 240 as a whole. In either case, the network module 220 generates the metric to identify improvements in the network 250 comparative to other models such that the metric provides a common point of comparison to subsequently determine which model performs well on the combined tasks.

At 860, the network module 220 provides the metric. In one approach, the network module 220 provides the metric to an assistance system of the vehicle 100, such as the autonomous driving module 160 to cause the module 160 to select between available models. Thus, the network module 220 can use the metric to assist the vehicle 100 in navigating by ensuring that the module 160 is using a model that is best suited to perform the combined tasks. In further aspects, the evaluation system 170 may separate select a model according to metrics for a plurality of different models including the network 250. In such a case, the evaluation system 170 may distribute the selected model via a communication pathway (e.g., a wireless communication link) to the vehicle 100 and/or other vehicles that perform machine perception of depth and object identification. In this way, the evaluation system 170 can accurately assess the models and identify improvements that may be unobservable according to other approaches.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the evaluation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the evaluation system 170, and/or the autonomous driving module(s) 160 may control some or all of these vehicle systems 140 and, thus, may be partially or fully autonomous.

The processor(s) 110, the evaluation system 170, and/or the autonomous driving module(s) 160 can be operatively connected to communicate with the various vehicle systems 140 and/or individual components thereof. For example, returning to FIG. 1, the processor(s) 110, the evaluation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the evaluation system 170, and/or the autonomous driving module(s) 160 may control some or all of these vehicle systems 140.

The processor(s) 110, the evaluation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the evaluation system 170, and/or the autonomous driving module(s) 160 can control the direction and/or speed of the vehicle 100. The processor(s) 110, the evaluation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the evaluation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An evaluation system, comprising:
a memory communicably coupled to one or more processors and storing:
a network module including instructions that, when executed by the one or more processors, cause the one or more processors to:
segment range data according to bounding boxes of objects identified in at least one of an image and the range data to produce masked data;
compare the masked data with corresponding depth estimates in a depth map generated by a network according to an evaluation mask that correlates the depth estimates with the depth map;
generate a metric according to the comparing to characterize an accuracy of the network at generating the depth map and the bounding boxes, wherein comparing the masked data with the depth estimates includes averaging values of the comparing on a per-object basis to form the metric; and
the metric that quantifies the comparing to assess the network that generated the depth map by scoring the network according to the metric in relation to other networks that have been scored with metrics calculated in a same manner.

2. The evaluation system of claim 1, wherein the network module includes instructions to compare the masked data including instructions to project the masked data into the image to produce the evaluation mask.

3. The evaluation system of claim 1, wherein the network module includes instructions to segment the range data to produce the masked data including instructions to select points from the range data that fall within the bounding boxes while discarding remaining points in the range data.

4. The evaluation system of claim 1, wherein the network module includes instructions to provide the metric including instructions to use the metric to train the network.

5. The evaluation system of claim 1, wherein the network module includes instructions to provide the metric including instructions to provide additional metrics for a plurality of models and selecting one of the models according to the metric and the additional metrics for activation within a device to facilitate machine perception of a surrounding environment.

6. The evaluation system of claim 1, wherein the network is a machine learning model for performing multiple tasks including at least depth estimation and object detection, and wherein the metric identifies improvements in the network comparative to other models to facilitate selection for machine perception within a device.

7. The evaluation system of claim 1, wherein the range data is LiDAR data.

8. A non-transitory computer-readable medium including instructions that, when executed by one or more processors, cause the one or more processors to:
- segment range data according to bounding boxes of objects identified in at least one of an image and the range data to produce masked data;
- compare the masked data with corresponding depth estimates in a depth map according to an evaluation mask that correlates the depth estimates with the depth map;
- generate a metric according to the comparing to characterize an accuracy of a network at generating the depth map and the bounding boxes, wherein comparing the masked data with the depth estimates includes averaging values of the comparing on a per-object basis to form the metric; and
- provide the metric that quantifies the comparing to assess the network that generated the depth map by scoring the network according to the metric in relation to other networks that have been scored with metrics calculated in a same manner.

9. The non-transitory computer-readable medium of claim 8, wherein the instructions to compare the masked data include instructions to project the masked data into the image to produce the evaluation mask.

10. The non-transitory computer-readable medium of claim 8, wherein the instructions to segment the range data to produce the masked data include instructions to selecting points from the range data that fall within the bounding boxes while discarding remaining points in the range data.

11. The non-transitory computer-readable medium of claim 8, wherein the instructions include instructions to provide the metric including instructions to use the metric to train the network.

12. A method, comprising:
- segmenting range data according to bounding boxes of objects identified in at least one of an image and the range data to produce masked data;
- comparing the masked data with corresponding depth estimates in a depth map according to an evaluation mask that correlates the depth estimates with the depth map;
- generating a metric according to the comparing to characterize an accuracy of a network at generating the depth map and the bounding boxes, wherein comparing the masked data with the depth estimates includes averaging values of the comparing on a per-object basis to form the metric; and
- providing the metric that quantifies the comparing to assess the network that generated the depth map by scoring the network according to the metric in relation to other networks that have been scored with metrics calculated in a same manner.

13. The method of claim 12, wherein comparing the masked data includes projecting the masked data into the image to produce the evaluation mask.

14. The method of claim 12, wherein the range data is LiDAR data, and wherein segmenting the range data to produce the masked data includes selecting points from the range data that fall within the bounding boxes while discarding remaining points in the range data.

15. The method of claim 12, wherein providing the metric includes using the metric to train the network.

16. The method of claim 12, wherein providing the metric includes providing additional metrics for a plurality of models and selecting one of the models according to the metric and the additional metrics for activation within a device to facilitate machine perception of a surrounding environment.

17. The method of claim 12, wherein the network is a machine learning model for performing multiple tasks including at least depth estimation and object detection, and wherein the metric identifies improvements in the network comparative to other models according to training to facilitate selection for machine perception within a device.

* * * * *